United States Patent
Yoshida

(10) Patent No.: US 9,450,237 B2
(45) Date of Patent: Sep. 20, 2016

(54) POSITIVE ELECTRODE ACTIVE MATERIAL FOR NON-AQUEOUS SECONDARY BATTERY AND METHOD OF MANUFACTURING THEREOF

(71) Applicant: Nichia Corporation, Anan-shi (JP)

(72) Inventor: Hideki Yoshida, Tokushima (JP)

(73) Assignee: NICHIA CORPORATION, Anan-Shi (JP)

( * ) Notice: Subject to any disclaimer, the term of this patent is extended or adjusted under 35 U.S.C. 154(b) by 0 days.

(21) Appl. No.: 14/667,636

(22) Filed: Mar. 24, 2015

(65) Prior Publication Data

US 2015/0270539 A1    Sep. 24, 2015

(30) Foreign Application Priority Data

Mar. 24, 2014   (JP) .................. 2014-060286
Jan. 29, 2015   (JP) .................. 2015-015790

(51) Int. Cl.
| | |
|---|---|
| H01M 4/36 | (2006.01) |
| H01M 4/525 | (2010.01) |
| H01M 4/505 | (2010.01) |
| H01M 4/04 | (2006.01) |
| H01M 4/1391 | (2010.01) |
| H01M 4/62 | (2006.01) |
| H01M 4/02 | (2006.01) |

(52) U.S. Cl.
CPC ........... *H01M 4/366* (2013.01); *H01M 4/0402* (2013.01); *H01M 4/0471* (2013.01); *H01M 4/1391* (2013.01); *H01M 4/505* (2013.01); *H01M 4/525* (2013.01); *H01M 4/62* (2013.01); *H01M 2004/028* (2013.01); *Y02E 60/122* (2013.01)

(58) Field of Classification Search
CPC .... H01M 4/366; H01M 4/525; H01M 4/505; H01M 4/0471; H01M 4/1391; H01M 2004/028; Y02E 60/122
See application file for complete search history.

(56) References Cited

U.S. PATENT DOCUMENTS

| 7,993,782 B2 | 8/2011 | Takada et al. |
| 2013/0209890 A1 | 8/2013 | Nagatomi |

FOREIGN PATENT DOCUMENTS

| JP | 06-321543 | 11/1994 |
| JP | 08-143314 | 6/1996 |
| JP | 2004-253395 | 9/2004 |
| JP | 2011-070789 A | 4/2011 |
| JP | 2012-074240 | 4/2012 |
| WO | WO-2007/004590 | 1/2007 |

*Primary Examiner* — Laura Weiner
(74) *Attorney, Agent, or Firm* — Foley & Lardner LLP

(57) ABSTRACT

A positive electrode active material for non-aqueous secondary battery includes core particles containing a lithium transition metal composite oxide, and a covering layer covering, that covers a surface of the core particle. The covering layer contains niobium and carbonate ions, and the carbonate ions are present at a concentration of from 0.2 weight % to 0.4 weight %. The positive electrode active material for non-aqueous secondary battery exhibits infrared absorption peaks at a wavenumber range of from 1320 $cm^{-1}$ to 1370 $cm^{-1}$, and at a wavenumber range of from 1640 $cm^{-1}$ to 1710 $cm^{-1}$.

12 Claims, 1 Drawing Sheet

POSITIVE ELECTRODE ACTIVE MATERIAL FOR NON-AQUEOUS SECONDARY BATTERY AND METHOD OF MANUFACTURING THEREOF

CROSS-REFERENCE TO RELATED APPLICATIONS

This application claims priority to Japanese Patent Application No. 2014-060286 filed on Mar. 24, 2014 and Japanese Patent Application No. 2015-015790, filed on Jan. 29, 2015. The entire disclosures of Japanese Patent Application No. 2014-060286 and No. 2015-015790 are hereby incorporated herein by reference.

BACKGROUND OF THE INVENTION

1. Field of the Invention

The present disclosure relates to a positive electrode active material for non-aqueous secondary battery and method of manufacturing the same.

2. Description of Related Art

The non-aqueous secondary batteries typified by lithium ion secondary batteries employ materials which allow desorption/insertion of alkali metal ions for positive electrode active materials, and single alkali metals such as metallic lithium or materials which allow desorption/insertion of alkali metal ions for negative electrode active materials, and non-aqueous electrolytic solutions for alkali metal ion conductive materials. In such non-aqueous secondary batteries, alkali metal ions are transferred between positive and negative electrodes through the alkali metal ion conductive materials to supply electric power to an external load. In a lithium ion secondary battery, a lithium transition metal composite oxide such as lithium cobaltate is typically used as a positive electrode active material.

A lithium ion secondary battery is one type of non-aqueous electrolyte secondary batteries, in which a non-aqueous electrolyte solution obtained by dissolving an electrolyte, which contains lithium ion, in an organic solvent is used as a lithium ion conductive material. As described above, non-aqueous secondary batteries employ an organic solvent and thus inherently dangerous because of the combustible and flammable nature or the like, requiring fire or explosion prevention measures.

Meanwhile, another type of lithium secondary battery is all-solid lithium secondary batteries which employ a lithium ion conductive inorganic solid substance (solid electrolyte) for a lithium ion conductive material. The need of an organic solvent can be eliminated in such all-solid secondary batteries such as all-solid lithium secondary batteries, so that safety measures in the non-aqueous electrolyte secondary batteries can be dispensed with, allowing for much simpler configurations of the batteries.

However, the all-solid secondary batteries generally have output characteristics lower than that of non-aqueous electrolyte secondary batteries. One of the causes is thought that a high-resistance region created in the interface between the solid electrolyte and electrode active material suppresses movement of the lithium ions. In order to improve the interface between the positive electrode active material and other components, it is proposed to cover the surface of the positive electrode active material with a specific material. Examples of the covering material include a niobium compound.

In JP 2011-070789A, proposed is a technology of adding niobium to a lithium-containing transition metal composite oxide in which nickel and manganese are essential components and which has a layered structure. It is said in JP 2011-070789A, according to the technology, the interface between the positive electrode and the non-aqueous electrolyte is improved and charge transfer reaction is accelerated, and output characteristics can be improved. As for more specific example of a method to add niobium, a method of mixing a lithium-containing transition metal composite oxide and niobium oxide at a predetermined mixing ratio and sintering the mixture at a predetermined temperature is disclosed.

In WO 2007/004590A, proposed is a technology of covering a surface of a positive electrode active material in an all-solid lithium secondary battery which employs a sulfide-based solid electrolyte. It is said in WO 2007/004590A, according to the technology, generation of a high-resistance layer in an interface between the sulfide-based solid electrolyte and the positive electrode active material can be suppressed and output characteristics of the all-solid lithium secondary battery can be improved. As for an example of the lithium ion conductive oxide, $LiNbO_3$ is illustrated. As for an example of more specific covering method, disclosed is a method in which an alkoxide solution which contains lithium and niobium is sprayed to particles of a positive electrode active material and then hydrolyzed by the moisture in the air. As for an example of the positive electrode active material, $LiCoO_2$ and $LiMn_2O_4$ are illustrated.

In JP 2004-253305A, proposed is a technology of adding a niobium compound or the like to a surface of a lithium nickel composite oxide, and sintering. It is said in JP 2004-253305A, according to the technology, the niobium compound or the like can be present stably on the surface of the lithium nickel composite oxide, so that the niobium compound or the like on the surface can be suppressed from dissolving into the electrolytic solution, which can suppress a rise of impedance during storage at a high temperature and a cycle operation at a high temperature. More specifically, disclosed is a method in which a lithium nickel composite oxide is dispersed in a commercial niobium oxide sol dispersed in acetone and then the acetone is evaporated, and the remained mixture is heated at a temperature of 120° C. to solidify the mixture. In JP 2004-253305A, the dispersion medium of the commercial niobium oxide is not described.

As for the material which contains niobium, a niobium oxide sol is known. For example, JP H06-321543A describes that a niobium oxide sol which contains oxalic acid and a niobium oxide has a fine particle diameter of 100 angstrom or less yet it is stable at a $(HCOO)_2/Nb_2O_5$ molar ratio of 0.2 to 0.8. It is said in JP H06-321543A, such a niobium oxide sol can be obtained by adding a predetermined amount of oxalic acid into an active niobium hydroxide slurry and conducting a thermal reaction under predetermined conditions.

In JP H08-143314A, described is a niobium oxide sol which is obtained by adding citric acid to an oxalic acid-stabilized niobium oxide sol can be present stably in the presence of other metallic elements such as cobalt.

SUMMARY OF THE INVENTION

A positive electrode active material for non-aqueous secondary battery, the positive electrode active material includes core particles containing a lithium transition metal composite oxide, and a covering layer, that covers a surface of the core particle. The covering layer contains niobium and carbonate ions and the carbonate ions are present at a concentration of from 0.2 weight % to 0.4 weight %. The positive electrode active material exhibits infrared absorption peaks at a wavenumber range of from 1320 cm$^{-1}$ to 1370 cm$^{-1}$ and at a wavenumber range of from 1640 cm$^{-1}$ to 1710 cm$^{-1}$.

The positive electrode active material can allow an improvement in the output characteristics of a non-aqueous secondary battery.

A method of manufacturing a positive electrode active material includes providing an oxalic acid-containing niobium oxide sol in which a molar ratio of oxalic acid to niobium oxide $(COOH)_2/Nb_2O_5$ is in a range of from 0.01 to 0.6; mixing core particles that contain a lithium transition metal composite oxide with the oxalic acid-containing niobium oxide sol to obtain sol-containing particles in which the oxalic acid-containing niobium oxide sol is present surfaces of the core particles; and heat treating the sol-containing particles at a temperature range of from 250° C. to 500° C., to form a covering layer that contains niobium and carbonate ions on surfaces of the core particles.

According to the method of manufacturing a positive electrode active material for non-aqueous secondary battery, it is possible to manufacture the positive electrode active material in which surfaces of the lithium transition metal composite oxide particles can be covered sufficient degree to reduce the interface resistance with the solid electrolyte.

DETAILED DESCRIPTION OF EMBODIMENTS

Figure 1:
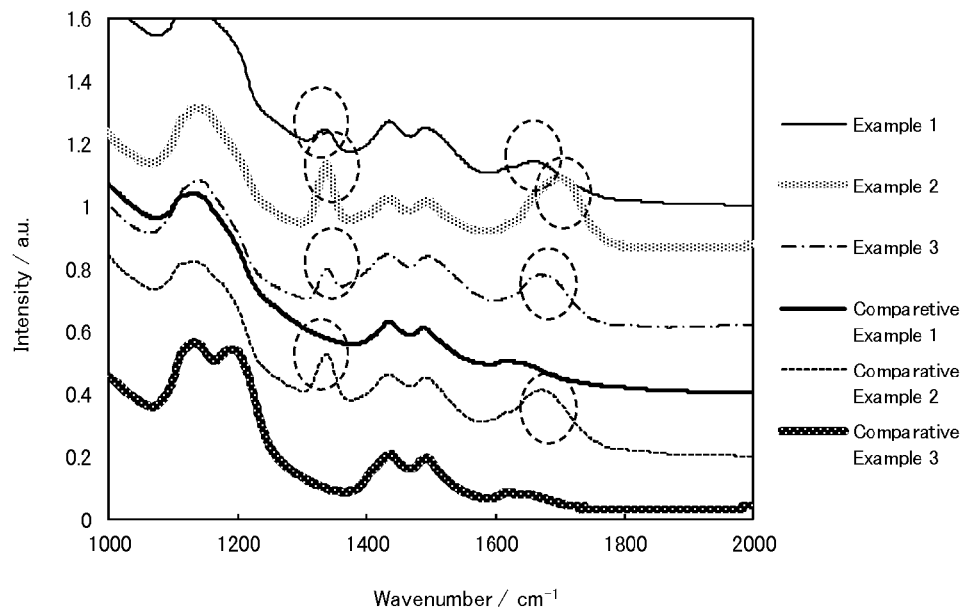
FIG. 1 is a diagram showing infrared spectra of the positive electrode active materials for non-aqueous secondary battery according to Examples 1 to 3 and Comparative Examples 1 to 3, respectively.

With the technology described in JP 2011-70789A, sufficient covering of the surfaces of particles of lithium transition metal composite oxide (core particles) with a niobium compound is difficult to obtain. For this reason, interface resistance between the positive electrode active material and the solid electrolyte cannot be reduced sufficiently. With the technology described in WO 2007/004590A, the surfaces of the core particles can be covered with a niobium compound, but the technology requires a complicated method and involves the use of an organic solvent, which may result in remaining organic matter. With the technology described in JP 2004-253305A, the state of covering of the surfaces of the core particles is unknown to begin with. As described above, a technology which allows sufficient covering of the surfaces of the core particles and a sufficient reduction of interface resistance has not been previously presented.

Under these circumstances, the present invention has been made. An object of an embodiment is to provide a method of manufacturing a positive electrode active material for non-aqueous secondary battery, with the positive electrode active material, the surfaces of the lithium transition metal composite oxide particles can be covered sufficient degree to reduce the interface resistance with the solid electrolyte. Another object of an embodiment is to provide a positive electrode active material which allows an improvement in the output characteristics of a non-aqueous secondary battery.

The present inventors have intensively studied so as to improve the above-mentioned characteristics, and thus the present invention has been completed. The present inventor has found that a positive electrode active material for non-aqueous secondary battery formed by covering particles of a lithium transition metal composite oxide with a niobium oxide sol which contains a predetermined amount of oxalic acid can sufficiently reduce the interface resistance with a solid electrolyte. Further, the positive electrode active material for non-aqueous secondary battery thus obtained has a peak at a specific wavenumber range in an infrared absorption spectrum and also has a carbonate ion concentration in a specific range. The present disclosure includes embodiments as described below.

A positive electrode active material for non-aqueous secondary battery according to an embodiment includes core particles, each particle includes a core particle which contains a lithium transition metal composite oxide and a covering layer which covers a surface of the core particle. The covering layer contains niobium and carbonate ions and the carbonate ions are present at a concentration of from 0.2 weight % to 0.4 weight %, and exhibits infrared absorption peaks at a wavenumber range of from 1320 cm$^{-1}$ to 1370 cm$^{-1}$, and at a wavenumber range of from 1640 cm$^{-1}$ to 1710 cm$^{-1}$.

A method of manufacturing a positive electrode active material according to an embodiment includes providing an oxalic acid-containing niobium oxide sol in which a molar ratio of oxalic acid to niobium oxide $(COOH)_2/Nb_2O_5$ is in a range of from 0.01 to 0.6; mixing core particles that contain a lithium transition metal composite oxide with the oxalic acid-containing niobium oxide sol to obtain sol-containing particles in which the oxalic acid-containing niobium oxide sol is present on surfaces of the core particles; and heat treating at temperature in the range of from 250° C. to 500° C., to form a covering layer that contains niobium and carbonate ions on a surface of the core particle.

Since the positive electrode active material for non-aqueous secondary battery according to an embodiment of the present disclosure has aforementioned features, the interface resistance with a non-aqueous electrolyte (particularly a solid electrolyte) can be reduced significantly. Thus, a non-aqueous secondary battery which employs the positive electrode active material for non-aqueous secondary battery (particularly all-solid secondary battery) according to the embodiments can achieve large improvements in output performance.

Since the method of manufacturing a positive electrode active material for non-aqueous secondary battery according to the embodiments has aforementioned features, the positive electrode active material for non-aqueous secondary battery has a carbonate ion concentration in a specific range and peaks at a specific wavenumber range in infrared absorption spectrum.

The positive electrode active material of the present disclosure will be described in more detail below by way of the embodiments and Examples. However, the present invention is not just limited only to these illustrative and exemplary. In the specification, the term "step" refers not only an independent step but also a step which is indistinguishable from other step but which can achieve an intended purpose. Further, the "content of each component in the composition" indicates that in the case where a plural number of substances corresponding to each component are present in the composition, refers to a total amount of the plural number of substance in the composition.

The positive electrode active material for non-aqueous secondary battery according to an embodiment of the disclosure includes a core particle that contains lithium transition metal composite oxide and a covering layer which covers at least a portion of the core particle and contains niobium and carbonate ions. Further details will be described below mainly on the covering layer.

Core Particle

For the core particles, a known lithium transition metal composite oxide may be used. Examples of the lithium transition metal composite oxide include a lithium cobalt composite oxide, a lithium nickel composite oxide, a lithium nickel cobalt manganese composite oxide, a lithium manganese composite oxide with a spinel structure, and a lithium iron phosphate with an olivine structure.

The lithium transition metal composite oxide which has a layer-structure such as a lithium cobalt composite oxide is preferable in terms of obtaining a non-aqueous secondary battery which has a good balance between charge-discharge capacity and energy density, or the like. Particularly, a lithium transition metal composite oxide which contains nickel, cobalt, and manganese as transition metals with a material amount ratio (in terms of mole) of approximately 1:1:1 is preferable. Further, a lithium transition metal composite oxide represented by the following formula is particularly preferable.

In the formula, a, x, and y respectively satisfy $0.95 \leq a \leq 1.2$, $0.30 \leq x \leq 0.40$, $0.30 \leq y \leq 0.40$, $0.60 \leq x+y \leq 0.70$.

The particle diameter of the core particle is not specifically limited and appropriately selected according to the purpose, or the like. The particle diameter of the core particles may be in a range of from 3 μm to 20 μm in terms of volume average particle diameter.

Covering Layer

The covering layer contains niobium and carbonate ions and further has peaks (the maximum value of absorption intensity) in a wavenumber range of from 1320 $cm^{-1}$ to 1370 $cm^{-1}$, and at a wavenumber range of from 1640 $cm^{-1}$ to 1710 $cm^{-1}$ in an infrared absorption spectrum. Those peaks are thought to be originated from compounds derived from oxalic acid. The detail of the forms of the compounds derived from oxalic acid are unknown but are assumed to present mainly as lithium oxalate. It is thought that the presence of the compounds derived from oxalic acid causes an electrostatic interaction between the core particle and the non-aqueous electrolyte (particularly the solid electrolyte), resulting in a significant reduction in the interface resistance. Niobium is assumed to be present in a form of niobium oxide, a composite oxide of niobium and elements which constitute the core particle, or a mixture of those. The covering layer that has aforementioned features can be formed efficiently by using a method of manufacturing a positive electrode active material to be described below, for example.

Due to its inclusion of niobium, the covering layer tends to be electrochemically active, that may result in physical or chemical degradation depending on the circumference around the covering layer. Such degradation of the covering layer can be prevented by inclusion of a certain amount of carbonate ions in the covering layer. However, with an excessive content of carbonate ions, the interface resistance between the positive electrode active material and the solid electrolyte tends to increase. For this reason, the carbonate ion concentration in the covering layer may be in a range of from 0.2 weight % to 0.4 weight %, preferably in a range of from 0.2 weight % to 0.3 weight % in the positive electrode active material. It is thought that the carbonate ions are supplied from carbon dioxide which is adsorbed to the core particle or by decomposition of oxalic acid group in the formation of the covering layer. The concentration of the carbonate ions in the covering layer can be adjusted in a desired range by adjusting the composition, particle size, synthesis conditions of the core particle, various conditions in covering, thermal treating, etc., which are to be described below.

As used herein, the term "a carbonate ion concentration in covering layer" refers to a content amount of carbonate ions in the covering layer which is calculated as the content rate of the carbonate ions in the positive electrode active material, and which means a content ratio of the carbonate ions in the positive electrode active material.

The carbonate ion concentration in the covering layer can be measured by immersing the positive electrode active material in pure water and quantitatively determining the eluded carbonate ions.

With the content of niobium in the covering layer being a predetermined amount or above, the interface resistance between the positive electrode active material and the solid electrolyte can be sufficiently reduced. Meanwhile, niobium in the covering layer does not involve charge and discharge capacity, so that with the content of niobium at a predetermined amount or less, charge-discharge capacity per unit weight tends to increase. Based on the above, a preferable content of niobium in the covering layer is in a range of from 0.05 mol % to 5.0 mol % with respect to the lithium transition metal composite oxide. A more preferable content of niobium in the covering layer is in a range of from 0.5 mol % to 3.0 mol % with respect to the lithium transition metal composite oxide. The content of niobium in the covering layer can be measured by subjecting the positive electrode active material to inductively coupled plasma (ICP) spectrometry.

The covering layer is formed on the surface of the core particle. The thickness of the covering layer is not specifically limited and appropriately selected according to the purpose, or the like. For example, the thickness of the covering layer can be selected so as to achieve a desired amount of carbonate ion concentration and niobium content.

The covering layer may be formed in a form of clearly distinguished from the core particle, or in a form in which the core particle and the covering layer do not constitute a clear layer structure but in a form in which the core particle and the covering layer do not form a clear layer structure and the content change in a continuous manner.

A method of manufacturing a positive electrode active material includes, providing a oxalic acid-containing niobium oxide sol in which a molar content ratio of oxalic acid to niobium oxide $(COOH)_2/Nb_2O_5$ is in a range of from 0.01 to 0.6 (hereinafter may be referred to as "sol preparing step"), mixing core particles that contain a lithium transition metal composite oxide with the oxalic acid-containing niobium oxide sol to obtain sol-containing particles in which the oxalic acid-containing niobium oxide sol is present on surfaces of the core particles (hereinafter may be referred to a "covering step"), and heat treating the sol-containing particles at a temperature in the range of from 250° C. to 500° C., to form a covering layer that contains niobium and carbonate ions on surfaces of the core particles (hereinafter may be referred to a "heat treating step"). In the description below, the aforementioned operations will be mainly illustrated.

Sol Preparing Step

In sol preparing step, an oxalic acid-containing niobium oxide sol is provided so that the material amount ratio of oxalic acid to niobium oxide $(COOH)_2/Nb_2O_5$ is in a range of from 0.01 to 0.6 in terms of mole. The oxalic acid-containing niobium oxide sol can be prepared as described below.

A niobium oxide sol dispersed in an aqueous medium is mixed with an oxalic acid aqueous solution to obtain an oxalic acid-containing niobium oxide sol. With a large material amount ratio of oxalic acid to niobium oxide $(COOH)_2/Nb_2O_5$, the interface resistance between the positive electrode active material and the solid electrolyte can be further reduced. Meanwhile, with a small material amount ratio, the carbonate ion content in the covering layer tends to be easily adjusted. In consideration of aforementioned, the material amount ratio of oxalic acid with respect to niobium oxide is preferably in a range of from 0.01 to 0.6 and more preferably in a range of from 0.01 to 0.5.

Covering Step

In covering step, the core particles are mixed with the oxalic acid-containing niobium oxide sol obtained in the sol preparing step to obtain sol-containing particles in which the oxalic acid-containing niobium sol is present on surfaces of the core particles. The mixing is preferably performed by fluidizing the core particles with a stirring device, then spraying or dropping the oxalic acid-containing niobium oxide sol thereto. The adding speed, adding amount, or the like of the oxalic acid-containing niobium oxide sol is adjusted so as not to lose the fluidity of the core particles during the mixing. With the mass ratio of the oxalic acid-containing niobium oxide sol to the core particles is small, the fluidity of the core particles can be maintained favorably during the mixing. On the other hand, with a large mass ratio, the interface resistance between the obtained positive electrode active material and the solid electrolyte can be sufficiently reduced. In consideration of aforementioned, the mass ratio of the oxalic acid-containing niobium oxide sol with respect to the core particles is preferably in a range of from 0.05 to 0.5 and more preferably in a range of from 0.1 to 0.5. The concentration of niobium in the oxalic acid-containing niobium oxide sol can be adjusted appropriately in consideration of those.

Heat Treating Step

In heat treating step, the sol-containing particles thus obtained are subjected to a heat treatment to form a covering layer on the surfaces of the core particles. The cover layer is preferably formed on the entire surfaces of the core particles. It is considered that in the heat treating step, a portion of oxalic acid in the oxalic acid-containing niobium oxide sol may be decomposed into carbonate ions, but a large amount of oxalic acid reacts with lithium in the core particles and is changed into lithium oxalate. Meanwhile, it is assumed that niobium is changed into niobium oxide, a composite oxide of niobium and elements which constitute the core particle, or a mixture of those. With a high heat treating temperature, a larger amount of oxalic acid can be decomposed into carbonate ions. On the other hand, with a low heat treating temperature, a certain amount of oxalic acid can be remained. In consideration of those, the heat treating temperature may be in a range of from 250° C. to 500° C. A preferable heat treating temperature may be in a range of from 300° C. to 450° C.

The atmosphere in the heat treating step is not specifically limited and the heat treating can be carried out under an air atmosphere or an inert gas atmosphere. The heat treatment time is, for example in a range of from 3 hours to 15 hours and preferably in a range of from 3 hours to 10 hours.

EXAMPLES

Now, more specific descriptions will be given in accordance to Examples below.

Example 1

A commercial niobium oxide sol dispersed in an aqueous medium was mixed with oxalic acid aqueous solution at a material amount ratio $(COOH)_2/Nb_2O_5$ of 0.2 in terms of mole to obtain an oxalic acid-containing niobium oxide sol with a niobium concentration of 0.47 mol/L and a density of 1.05 g/cm$^3$.

A lithium transition metal composite oxide which has a layer-structure as a core particle and represented by a composition formula: $Li_{1.15}Ni_{1/3}Co_{1/3}Mn_{1/3}O_2$ was provided. While stirring 1000 g of the core particles with an impeller-type stirring device, 392 g of an oxalic acid-containing niobium sol was added in drop for 20 minutes to obtain sol-containing particles.

The obtained sol-containing particles were subjected to heat treating at a temperature of 400° C. for 5 hours to obtain the objective positive electrode active material.

Example 2

A commercial niobium oxide sol dispersed in an aqueous medium was mixed with oxalic acid aqueous solution at a material amount ratio $(COOH)_2/Nb_2O_5$ of 0.5 in terms of mole to obtain an oxalic acid-containing niobium oxide sol with a niobium concentration of 0.94 mol/L and a density of 1.03 g/cm$^3$.

The core particles similar to that in Example 1 were prepared. While stirring 1000 g of the core particles with an impeller-type stirring device, 490 g of an oxalic acid-containing niobium sol was added in drop for 20 minutes to obtain sol-containing particles.

The obtained sol-containing particles were subjected to heat treating at a temperature of 400° C. for 5 hours to obtain the objective positive electrode active material.

Example 3

A commercial niobium oxide sol dispersed in an aqueous medium was mixed with oxalic acid aqueous solution at a material amount ratio $(COOH)_2/Nb_2O_5$ of 0.5 in terms of mole to obtain an oxalic acid-containing niobium oxide sol with a niobium concentration of 0.84 mol/L and a density of 1.05 g/cm$^3$.

The core particles similar to that in Example 1 were prepared. While stirring 1000 g of the core particles with an impeller-type stirring device, 700 g of an oxalic acid-containing niobium sol was added in drop for 20 minutes to obtain sol-containing particles.

The obtained sol-containing particles were subjected to heat treating at a temperature of 400° C. for 5 hours to obtain the objective positive electrode active material.

Comparative Example 1

The commercial niobium oxide sol in Example 1 was provided. The niobium concentration was 0.47 mol/L and the density was 1.05 g/cm$^3$ in the niobium oxide sol. The core particles similar to that in Example 1 were also prepared. While stirring 1000 g of the core particles with an impeller-type stirring device, 390 g of the commercial niobium sol was added in drop for 20 minutes to obtain sol-containing particles.

The obtained sol-containing particles were subjected to heat treating at a temperature of 400° C. for 5 hours to obtain the objective positive electrode active material.

Comparative Example 2

A commercial niobium oxide sol dispersed in an aqueous medium was mixed with oxalic acid aqueous solution at a material amount ratio $(COOH)_2/Nb_2O_5$ of 1.0 in terms of mole to obtain an oxalic acid-containing niobium oxide sol with a niobium concentration of 0.46 mol/L and a density of 1.05 g/cm$^3$.

The core particles similar to that in Example 1 were prepared. While stirring 1000 g of the core particles with an impeller-type stirring device, 399 g of an oxalic acid-containing niobium sol was added in drop for 20 minutes to obtain sol-containing particles.

The obtained sol-containing particles were subjected to heat treating at a temperature of 400° C. for 5 hours to obtain the objective positive electrode active material.

Comparative Example 3

A positive electrode active material was obtained in a similar manner as in Example 1 except that the heat treatment temperature was 600° C.

Evaluation of Positive Electrode Active Material

In the Examples 1 to 3 and Comparative Example 1 and 2, the characteristics of the positive electrode active material were measured in the manner described below.

Infrared Spectroscopic Analysis

On the positive electrode active material particles, an infrared spectroscopic analysis by a diffused reflection method was conducted.

Measuring Carbonate Ion Concentration

A positive electrode active material 10 g was dispersed in pure water 50 mL for 1 hour at room temperature (25° C.), and the positive electrode active material and the solution were separated. The amount of carbonate ions were determined by titrating the solution in accordance to Warder's method. For the indicators, a phenolphthalein solution was used for the first stage and a bromophenol blue solution was used for the second stage.

Measuring Niobium Content

Inductively coupled plasma (ICP) analysis was conducted on the positive electrode active material to determine the content of niobium with respect to the lithium transition metal composite oxide.

Evaluation of Battery

With the use of the positive electrode active materials obtained by Examples 1 to 3 and Comparative Examples 1 to 3 respectively, secondary batteries were fabricated as described below and the batteries were evaluated.

Preparing Solid Electrolyte

Under an argon atmosphere, lithium sulfide and phosphorus pentasulfide were weighed at a material amount ratio of 7:3 and mixed in an agate mortar. Obtained mixture was further pulverized and mixed in a ball mill to obtain a sulfide glass. The obtained sulfide glass was used as a solid electrolyte.

Preparing Positive Electrode Mixture

A positive electrode mixture was obtained by mixing 60 parts by mass of the positive electrode active material, 36 parts by weight of a solid electrolyte, and 4 parts by weight of a VGCF (vapor grown carbon fiber).

Preparing Negative Electrode For the negative electrode, an indium foil of 0.05 mm in thickness was hollowed out in a circular shape with a diameter of 11.00 mm.

Preparing Battery

A cylindrical lower mold having an outer diameter of 11.00 mm was inserted in a cylindrical outer mold having an inner diameter of 11.00 mm from the lower end of the outer mold. The upper end of the lower mold was fixed at an intermediate position of the outer mold. In this state, 80 mg of solid electrolyte was placed in the outer mold from the upper side of the outer mold onto the top end of the lower mold. Then, a cylindrical lower mold having an outer diameter of 11.00 mm was inserted in a cylindrical outer mold from the lower end of the outer mold. After the insertion, a pressure of 90 MPa was applied from above the upper mold to mold a solid electrolyte into a solid electrolyte layer. After the molding, the upper mold was taken out from above the outer mold and 20 mg of a positive electrode mixture was placed in the upper portion of the solid electrolyte layer from above the outer mold. After the placement, the upper mold was inserted again, and a pressure of 360 MPa was applied to mold the positive electrode mixture into a positive electrode layer. After the molding, the upper mold was fixed and the fixation of the lower mold was released to pull the lower mold out from the lower part of the outer mold. Then, the negative electrode was placed under the solid electrolyte layer from the lower part of the outer mold. After the placement, the lower mold was inserted again, and a pressure of 150 MPa was applied from below the lower mold to mold the negative electrode into a negative electrode layer. While applying the pressure, the lower mold was fixed, and a positive terminal was attached to the upper mold and a negative terminal was attached to the lower mold, thus, an all-solid secondary battery was obtained.

Discharge Characteristics

Constant current and constant voltage charging was performed at a current density of 0.195 µA/cm$^2$ and a charge voltage of 4.0 V. After charging, constant current discharging was performed at a current density of 0.195 µA/cm$^2$ and a charge voltage of 1.9 V, and the discharge capacity Qd was measured. In an all-solid secondary battery which employs a solid electrolyte which has a lower lithium ion conductivity compared to that of an non-aqueous electrolyte, the interface resistance between the positive electrode active material and the solid electrolyte affects the discharge capacity of the all-solid secondary batteries. For this reason, degree of lowness of the interface resistance was determined by the level of the Qd.

Figure 2:
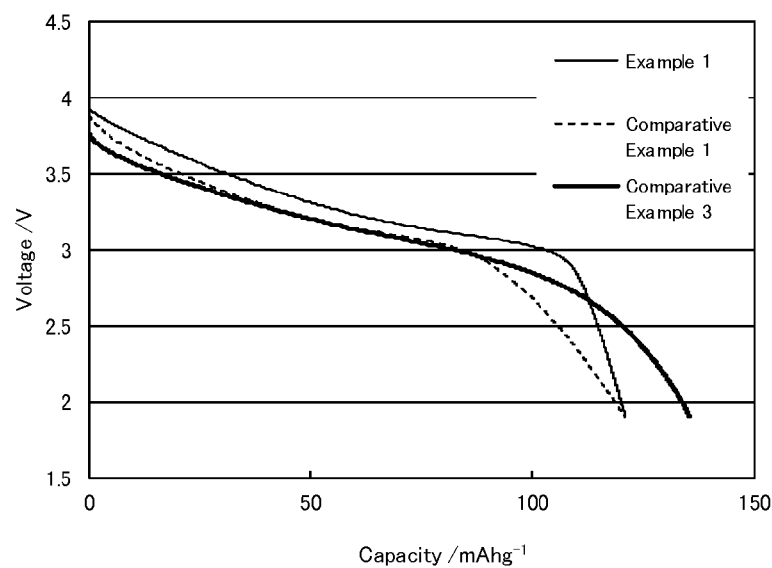
FIG. 2 is diagram showing discharge curves of all-solid secondary batteries which use the positive electrode active materials for non-aqueous secondary battery according to Examples 1 and Comparative Examples 3, respectively.

FIG. 1 is a diagram showing infrared spectra of the positive electrode active materials obtained in Examples 1 to 3 and Comparative Examples 1 to 3, respectively. With regard to Examples 1 to 3 and Comparative Examples 1 to 3, manufacturing conditions of the respective positive electrode active material are shown in Table 1, and characteristics and discharge characteristics of the positive electrode active materials are shown in Table 2. Further, FIG. 2 is a diagram showing discharge curves of all-solid secondary batteries which use the positive electrode active materials obtained in Example 1 and Comparative Examples 1 and 3, respectively.

TABLE 1

| | Sol Preparing Step | | Covering Step | Heat Treating Step |
|---|---|---|---|---|
| | $(COOH)_2/$ $Nb_2O_5$ | Nb Concentration in Sol | Sol/Core Particle* | Heat Treating Temperature |
| Example 1 | 0.2 | 0.47 mol/L | 0.392 | 400° C. |
| Example 2 | 0.5 | 0.94 mol/L | 0.490 | |
| Example 3 | 0.2 | 0.84 mol/L | 0.700 | |
| Comparative Example 1 | 0 | 0.47 mol/L | 0.390 | 400° C. |
| Comparative Example 2 | 1.0 | 0.46 mol/L | 0.399 | |
| Comparative Example 3 | 0.2 | 0.47 mol/L | 0.392 | 600° C. |

*mass ratio

TABLE 2

| | $CO_3^{2-}/$ wt. % | Nb*/ mol % | Qd/ $mAhg^{-1}$ |
|---|---|---|---|
| Example 1 | 0.28 | 1.7 | 129 |
| Example 2 | 0.37 | 4.4 | 136 |
| Example 3 | 0.20 | 6.3 | 126 |
| Comparative Example 1 | 0.08 | 1.7 | 117 |
| Comparative Example 2 | 0.46 | 1.7 | 115 |
| Comparative Example 3 | 0.15 | 1.7 | 136 |

*With respect to lithium transition metal composite oxide

From FIGS. 1 and 2, it can be seen that the positive electrode active materials of Examples 1 to 3, which are obtained by using oxalic acid-containing niobium sol with appropriately adjusted $(COOH)_2/Nb_2O_5$ and are subjected to a heat treating at an appropriate heat-treating temperature respectively have predetermined carbonate ion concentrations and predetermined peaks in respective infrared absorption spectrum (parts surrounded by broken line in FIG. 1). As a result, the all-solid secondary batteries which use the positive electrode active material of Examples 1 to 3 respectively have higher discharge capacity Qd compared to that of the all-solid secondary batteries which use the positive electrode active materials of Comparative examples 1 and 2.

From FIG. 1 and FIG. 2, the positive electrode active material of Comparative Example 1 in which the ratio $(COOH)_2/Nb_2O_5$ is too small, and the positive electrode active material of Comparative Example 3 which was subjected to an excessively high heat treatment temperature may fail to have a predetermined carbonate ion concentration nor shows a predetermined infrared-spectroscopic spectrum. For this reason, the all-solid secondary batteries which use the positive electrode active materials of Comparative Examples 1 and 3 respectively exhibit lower average voltage. Those results are assumed to be a result of destruction of the covering layer due to charging and discharging of the batteries. It is disadvantageous that with a low average voltage during discharging, the energy density of the all-solid secondary battery decreases.

With the use of a positive electrode active material according to the embodiments of the present disclosure, an all-solid secondary battery excellent in output characteristics can be obtained. Accordingly, the all-solid secondary battery can be suitably used as a power source of machinery which require large output and high level of safety.

As described above, it should be obvious that various other embodiments are possible without departing the spirit and scope of the present invention. Accordingly, the scope and spirit of the present invention should be limited only by the following claims.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive electrode active material for non-aqueous secondary battery, the positive electrode active material comprising:
   core particles containing a lithium transition metal composite oxide, and
   a covering layer, that covers a surface of the core particle, wherein the covering layer comprises niobium and carbonate ion and the carbonate ions are present at a concentration of from 0.2 weight % to 0.4 weight %;
   and exhibits infrared absorption peaks at a wavenumber range of from 1320 cm-1 to 1370 cm$^{-1}$, and at a wavenumber range of from 1640 cm-1 to 1710 cm$^{-1}$,
   wherein the lithium transition metal complex oxide is represented by the following formula:

$$Li_aNi_{1-x-y}Co_xMn_yO_2$$

and a, x, and y, respectively, satisfy 0.95≤a≤1.2, 0.30≤x≤0.40, 0.30≤y≤0.40, 0.60≤x+y≤0.70.

2. The positive electrode active material according to claim 1, wherein the niobium in the covering layer is present at a concentration of from 0.05 mol % to 5.0 mol % with respect to the lithium transition metal composite oxide.

3. The positive electrode active material according to claim 2, wherein the carbonate ion concentration in the covering layer is in a range of from 0.2 weight % to 0.3 weight %.

4. The positive electrode active material according to claim 3, wherein the particle diameter of the core particles may be in a range of from 3 μm to 20 μm in terms of volume average particle diameter.

5. The positive electrode active material according to claim 2, wherein the particle diameter of the core particles may be in a range of from 3 μm to 20 μm in terms of volume average particle diameter.

6. The positive electrode active material according to claim 1, wherein the carbonate ion concentration in the covering layer is in a range of from 0.2 weight % to 0.3 weight %.

7. The positive electrode active material according to claim 6, wherein the content of niobium in the covering layer is in a range of from 0.5 mol % to 3.0 mol % with respect to the lithium transition metal composite oxide.

8. The positive electrode active material according to claim 7, wherein the particle diameter of the core particles may be in a range of from 3 μm to 20 μm in terms of volume average particle diameter.

9. The positive electrode active material according to claim 6, wherein the particle diameter of the core particles may be in a range of from 3 μm to 20 μm in terms of volume average particle diameter.

10. The positive electrode active material according to claim 1, wherein the content of niobium in the covering layer is in a range of from 0.5 mol % to 3.0 mol % with respect to the lithium transition metal composite oxide.

11. The positive electrode active material according to claim 10, wherein the particle diameter of the core particles may be in a range of from 3 μm to 20 μm in terms of volume average particle diameter.

12. The positive electrode active material according to claim 1, wherein the particle diameter of the core particles may be in a range of from 3 μm to 20 μm in terms of volume average particle diameter.

* * * * *